United States Patent [19]

Franciscus et al.

[11] Patent Number: 5,184,460
[45] Date of Patent: Feb. 9, 1993

[54] MULTI-HEAT ADDITION TURBINE ENGINE

[75] Inventors: Leo C. Franciscus, Lakewood; Theodore A. Brabbs, Cleveland, both of Ohio

[73] Assignee: The United States of America as represented by the Administrator, National Aeronautics and Space Administration, Washington, D.C.

[21] Appl. No.: 647,902

[22] Filed: Jan. 30, 1991

[51] Int. Cl.⁵ ............................ F02K 3/04; F02K 3/08
[52] U.S. Cl. ................................ 60/226.1; 60/39.17
[58] Field of Search ............... 60/39.04, 39.17, 226.1, 60/39.161, 262, 263

[56] References Cited

U.S. PATENT DOCUMENTS

| | | | |
|---|---|---|---|
| 2,407,166 | 9/1946 | Kreitner et al. | 60/39.17 |
| 2,504,181 | 4/1950 | Constant | 60/226.1 |
| 2,584,232 | 2/1952 | Seville | 60/39.17 |
| 2,654,993 | 10/1953 | Owner | 60/39.16 |
| 3,867,813 | 2/1975 | Leibach | 60/225 |
| 4,206,593 | 6/1980 | Su et al. | 60/39.04 |

*Primary Examiner*—Louis J. Casaregola
*Attorney, Agent, or Firm*—Gene E. Shook; Guy Miller; James A. Mackin

[57] ABSTRACT

A multi-heat addition turbine engine (MHATE) incorporates a plurality of heat addition devices to transfer energy to air and a plurality of turbines to extract energy from the air while converting it to work. The MHATE provides dry power and lower fuel consumption or lower combustor exit temperatures.

2 Claims, 4 Drawing Sheets

MULTI-HEAT ADDITION TURBINE ENGINE

ORIGIN OF THE INVENTION

The invention described herein was made by an employee of the United States Government together with a contractor employee performing work under a NASA contract and is subject to the provisions of Section 305 of the National Aeronautics & Space Act (1958), Public Law 85-568 (72 Statute 435; 42 USC 2457).

TECHNICAL FIELD

This invention is directed to a multi-heat addition turbine engine (MHATE). The invention is particularly concerned with a gas turbine engine which incorporates heat addition devices between multiple turbines. The invention further relates to heat addition devices which transfer energy to air, as well as turbines which extract energy from air and convert it to work.

It is desirable to obtain as much dry power from a turbine engine as possible. Another goal in the turbine engine art is to lower fuel consumption at the same or lower combustor exit temperatures than utilized in prior art turbine engines.

It is, therefore, an object of the present invention to provide an improved gas turbine engine whose fuel consumption is lower than conventional turbine engines.

A further object of the invention is to provide an improved gas turbine engine which has the same thrust as conventional turbine engines at lower combustor exit temperatures as well as higher thrust for the same combustor exit temperatures as conventional gas turbine engines.

A still further object of the invention is to provide a gas turbine engine having longer engine life, lower turbine cooling air requirements, and a potential for lower $NO_x$ levels.

BACKGROUND ART

U.S. Pat. No. 2,654,993 to Owner is concerned with gas turbine engines, each comprising a main turbine having a pair of rotating rotors through which gas is passed in succession and an auxiliary turbine to drive the engine which is driven by gasses drawn off from the rotors of the main turbine. Each engine comprises an axial-flow compressor, combustion equipment, and an axial flow turbine having a pair of independent rotors through which the combustor gas is passed in succession. More particularly, gas is bled from between the high and lower pressure turbines, respectively. This bled gas powers an auxiliary turbine which may be used to power an auxiliary engine and/or aircraft accessories.

U.S. Pat. No. 3,867,813 to Leibach is directed to a turbine engine having an additional fan, burner and turbine to increase power during takeoff and landing. These added components are not intended for operation at other flight conditions.

U.S. Pat. No. 4,206,593 to Su et al describes a gas turbine comprising an air compressor, one or more combustion chambers, and one or more expansion turbines. The air compressor, the combustion chambers and the turbines can be placed on one shaft or on separate shafts so long as the gasses flow in a direction from the compressors to the combustion chambers and then to the turbine.

DISCLOSURE OF THE INVENTION

A gas turbine engine constructed in accordance with the present invention utilizes heat addition devices between multiple turbines. The heat addition devices transfer energy to air. The turbines extract energy from air and convert it to work.

This multi-heat addition turbine engine (MHATE) provides dry power and lower fuel consumption or lower combustor exit temperatures. The preferred embodiment comprises a two spool turbofan with six combustors and six turbines.

BRIEF DESCRIPTION OF THE DRAWINGS

The objects, advantages, and novel features of the invention will be more fully apparent from the following detailed description when read in connection with the accompanying drawings wherein.

BEST MODE FOR CARRYING OUT THE INVENTION

Figure 1:
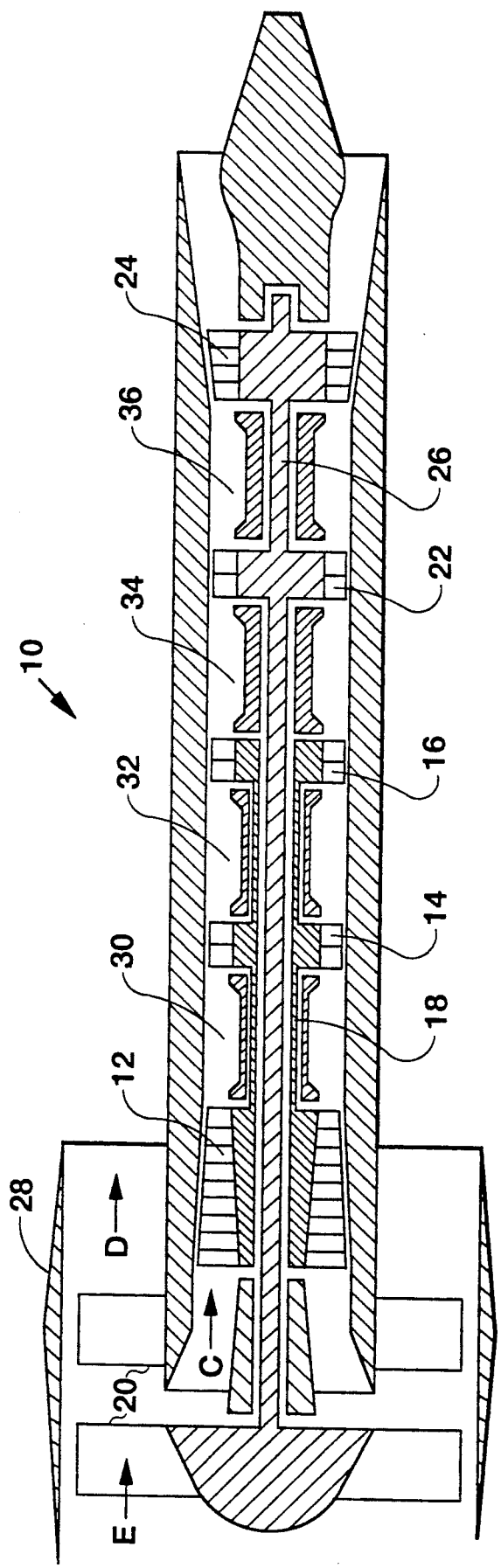
FIG. 1 is a schematic view, in section, of a multi-heat addition turbine engine constructed in accordance with the present invention.

Referring now to FIG. 1 there is shown a gas turbine engine 10 having multiple heat addition devices constructed in accordance with the present invention. The engine 10 has a compressor 12 that is powered by a pair of turbines 14 and 16. The compressor 12 as well as the turbines 14 and 16 are mounted on a shaft 18.

A fan 20 is mounted adjacent to the compressor 12. The fan 20 is powered by a pair of turbines 22 and 24. The fan 20 as well as the turbines 22 and 24 are mounted on a shaft 26.

In operation engine air indicated by the arrow E goes through and is compressed in the fan 20. Because the engine 10 is a turbofan, the fan discharge air is split into two streams. The first of these streams indicated by the arrow D is discharged through a bypass nozzle 28. The other stream indicated by the arrow C is compressed further in the compressor 12 and heated in a combustor 30.

The air passes through the turbine 14 where energy is extracted from this air for turbine power causing a decrease in the air temperature and pressure. The air is heated again in a second combustor 32. This heated air then passes through the turbine 16 where energy is extracted for turbine power causing still another decrease in the air temperature and pressure.

The air then is heated in a third combustor 34. This heated air then passes through the turbine 22 where energy is extracted for turbine power causing a decrease in the air temperature and pressure.

The air is again heated in a fourth combustor 36. This heated air then passes through the turbine 24 where energy is extracted for turbine power, thereby causing a decrease in the air temperature and pressure.

An important novel feature of the MHATE is the placement of the heat addition devices which are the combustors (30,32,34 and 36) between the turbines (14,16,22 and 24). The heat addition devices can be any device to transfer energy to the air. The turbines can be any device capable of extracting energy from the air and converting it to useful work. The arrangement of the heat addition devices and turbines is not restricted to one combustor followed by one turbine, but may be in any combination.

Figure 2:
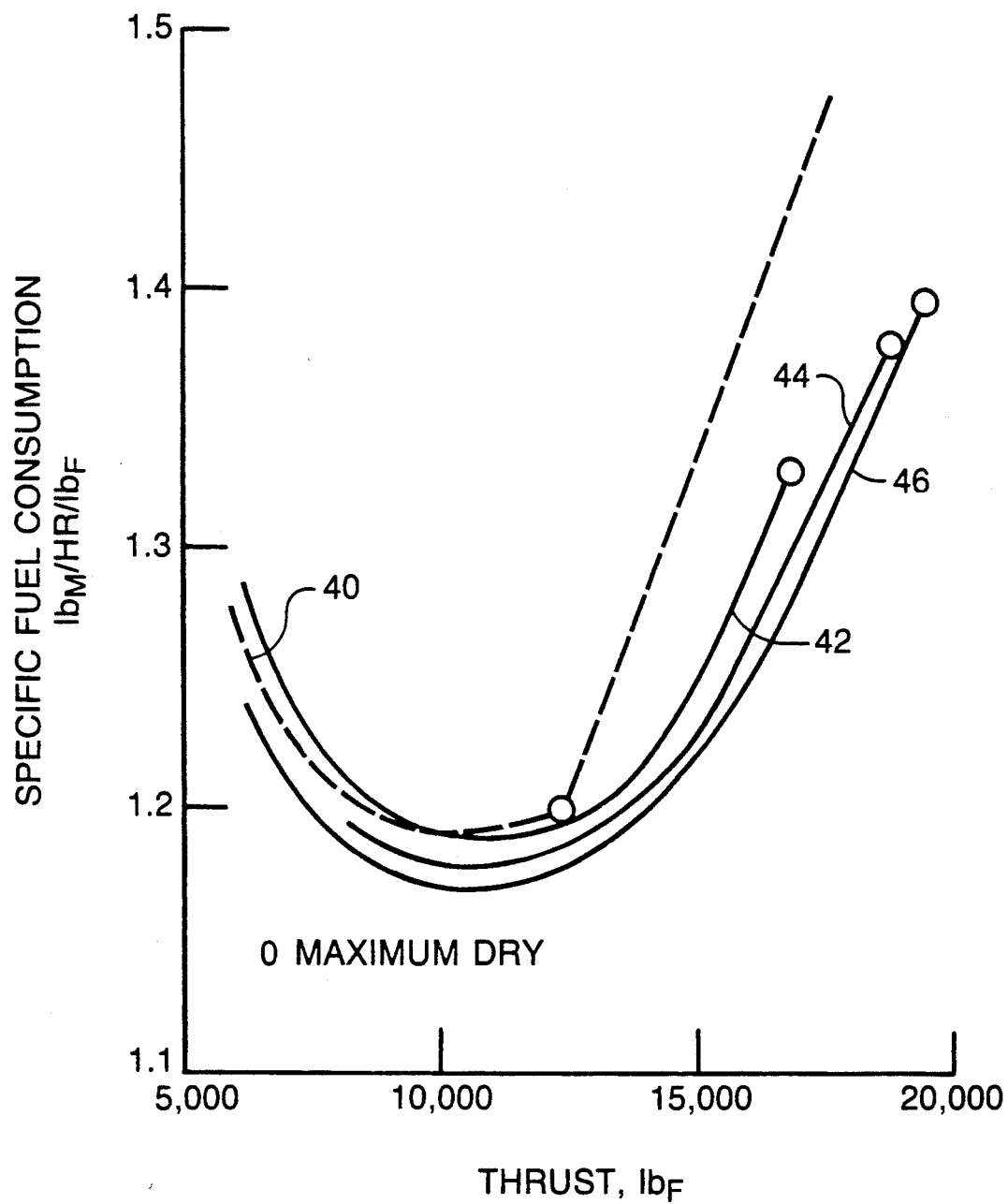
FIG. 2 is a graph showing specific fuel consumption plotted against thrust to show comparisons of performance of multi-heat addition turbine engines (MHATE) each having a maximum combustion exit temperature of 3260° R. compared with a conventional single combustor engine having a maximum combustor exit temperature of 3260° R.

Comparisons of the performance of three MHATE turbofans with a single combustor turbofan are shown in FIG. 2. These curves are for a flight mach number of 2.4 at an altitude of 55,000 feet. The 600 $lb_m$/sec. turbofan engines each have a bypass ratio of 1.0. The maximum combustor exit temperature ($CET_m$) is 3260°R.

The performance of a conventional single combustor engine is illustrated by a curved line 40 having a straight after burning portion. The performance of a multi-heat addition turbine engine having two combustors is illustrated by the line 42. The line 44 illustrates the performance of an MHATE having four combustors, while a six combustor MHATE is shown in line 46.

FIG. 2 shows that at high thrust of 18,000 $lb_f$, the specific fuel consumption (SFC) of the MHATE is about 13% lower than the single combustor turbofan engine. At 10,000 $lb_f$ thrust the specific fuel consumption of the four types of engines is about the same.

Figure 3:
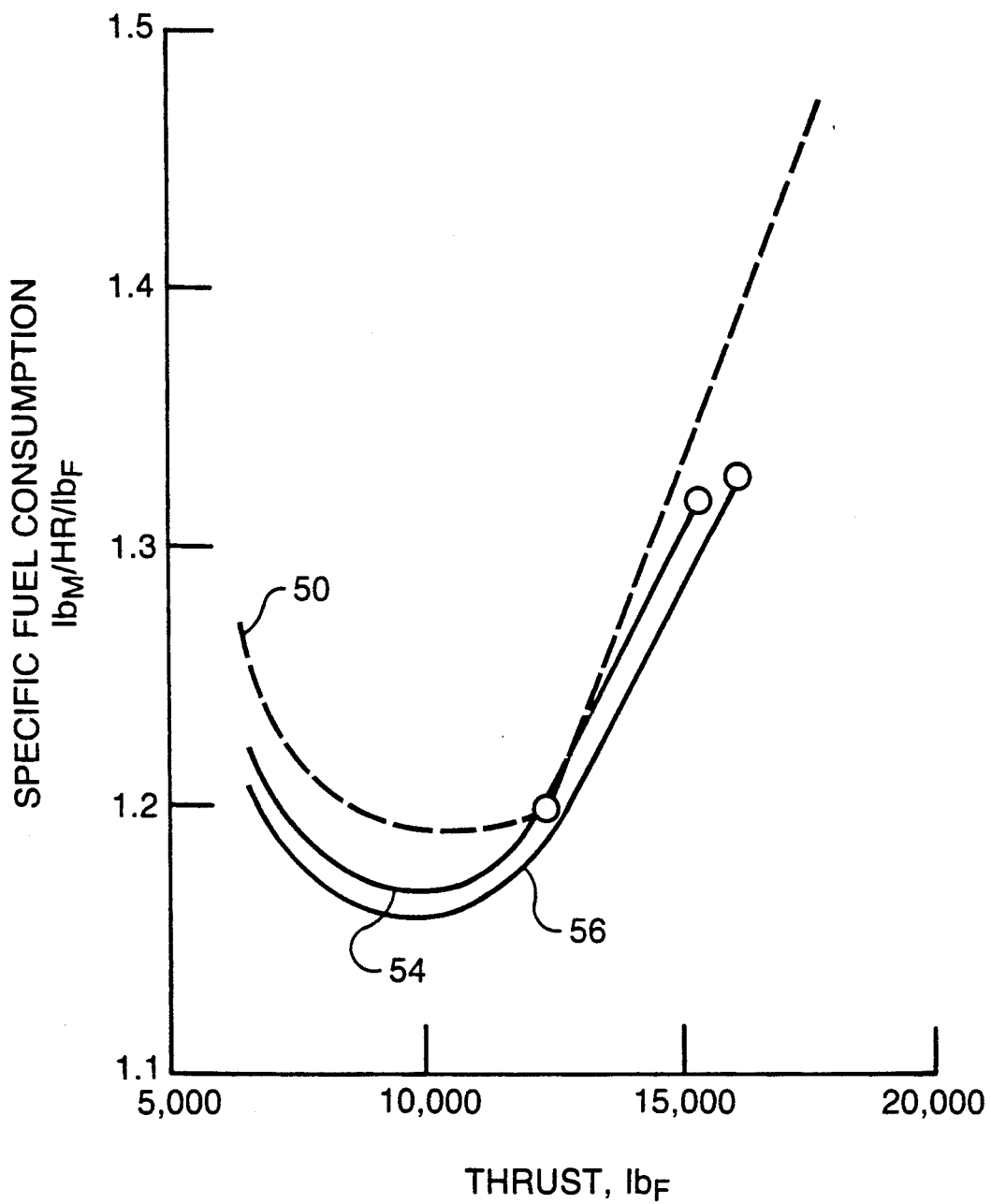
FIG. 3 is a graph similar to FIG. 2 with the maximum combustor exit temperature of the multi-heat addition turbine engines being 2800° R.

Referring now to FIG. 3, the performance of a conventional single combustor engine with a maximum combustor exit temperature of 3260° R. is shown by the line 50 having a curved portion at the lower thrust and a substantially straight line after burning portion at the higher thrust. The performance of a MHATE having four combustors with an exit temperature of 2800° R. is illustrated by the line 54, while a MHATE having six combustors with an exit temperature of 2800° R. is shown by the line 56.

The single combustor engine performance illustrated by the line 50 is substantially the same as in FIG. 2 with a maximum combustor exit temperature of 3260° R. Even though the MHATE combustor exit temperatures are about 460° R. lower than the single combustor engine, the maximum dry thrust of the MHATE engines is higher than that of the conventional single combustor engine and the specific fuel consumptions (SFC), are somewhat lower.

Figure 4:
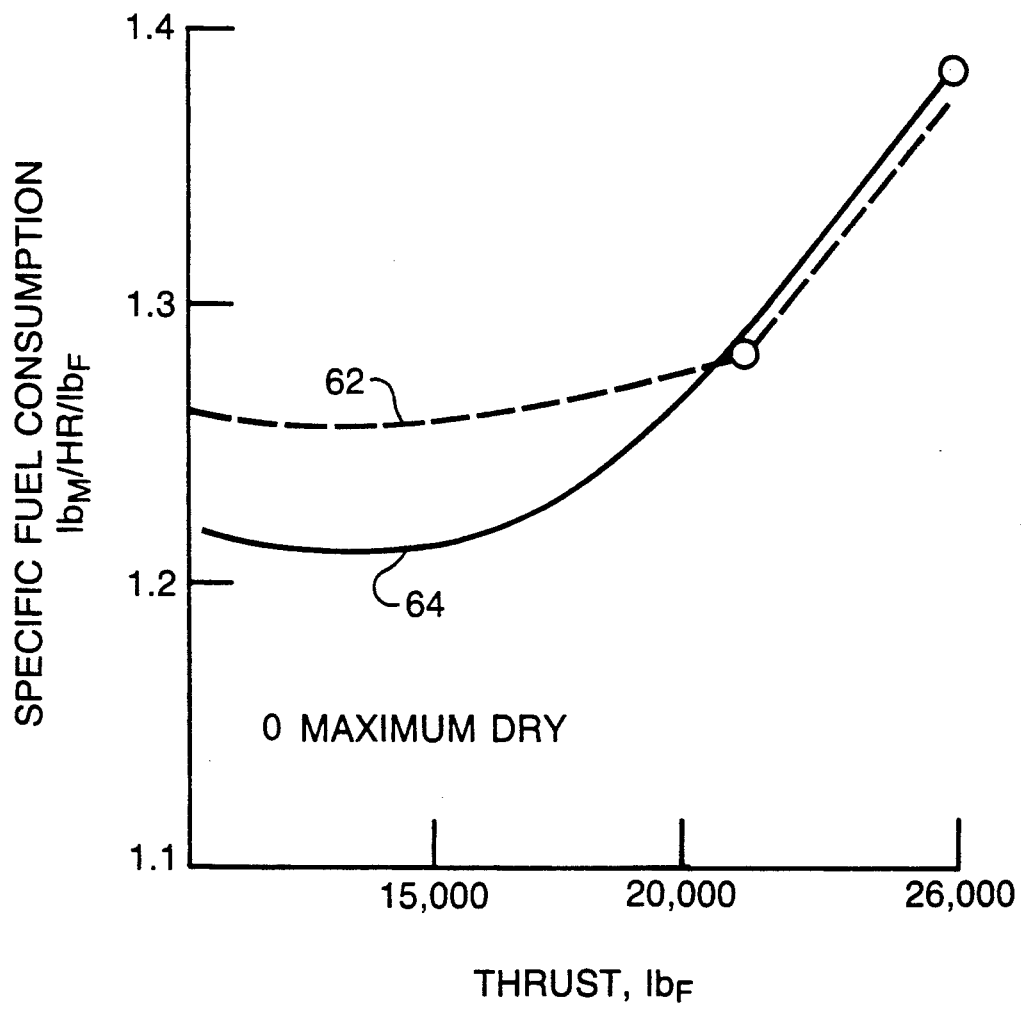
FIG. 4 is a graph similar to FIGS. 2 and 3 showing the parameters of a four combustor multiple heat addition turbojet having a maximum combustor exit temperature of 2800° R. compared to a conventional single combustor turbo-jet with a maximum combustor exit temperature of 3260° R.

Referring now to FIG. 4, the performance of a conventional single combustor dry turbojet having a maximum combustion exit temperature ($CET_m$) of 3260° R. is shown by the curved line 62 having a substantially straight after burning portion. The performance of a four combustor MHATE turbojet having a maximum combustor exit temperature ($CET_m$) of 2800° R. is illustrated by the line 64.

The MHATE achieves 20% higher maximum dry thrust than the conventional higher temperature turbojet. With after burning, the conventional turbojet can achieve the same thrust as the MHATE turbojet. At lower thrust of 15,000 $lb_f$, the SFC's of the MHATE are 4% better than the conventional turbojet.

FIGS. 2, 3 and 4 illustrate a number of advantages of the MHATE over a conventional single combustor engine. These graphs show that the MHATE exhibits lower fuel consumption, the same thrust at lower combustor exit temperatures, and higher thrust for the same combustor exit temperature. This results in longer engine life, lower turbine cooling air requirements and a potential for lower $NO_x$ levels.

While the preferred embodiment of the invention has been shown and described it will be appreciated that various modifications may be made to the engine without departing from the spirit of the invention or the scope of the subjoined claims.

We claim:

1. A multi-heat addition turbine engine (MHATE) having reduced turbine air requirements and lower $NO_x$ levels comprising
    a fan for compressing engine air,
    a first shaft for mounting said fan for rotation,
    a compressor for receiving a portion of the compressed air from said fan and further compressing the same,
    a second shaft for mounting said compressor for rotation,
    at least one first combustor for transferring energy to said compressed air from said compressor by heating the same thereby raising the temperature of said compressed air,
    a first turbine adjacent to said first combustor and in constant communication therewith for converting energy from said heated compressed air to work in turning said second shaft thereby driving said compressor whereby the temperature of said compressed air is decreased,
    at least one second combustor adjacent to said first turbine and in constant communication therewith for transferring energy to said energy extracted air from said first turbine for transferring energy to said energy extracted air by heating the same thereby raising the temperature of said energy extracted air, and
    a second turbine adjacent to said second combustor and in constant communication therewith for converting energy from said heated air from said second combustor to work in turning said first shaft thereby driving said fan whereby the temperature of said heated air is decreased thereby lowering the $NO_x$ levels of the air discharged from said turbine.

2. A MHATE as claimed in claim 1 wherein the first shaft is coaxial with the second shaft.

* * * * *